(12) United States Patent
Harada et al.

(10) Patent No.: US 9,683,665 B2
(45) Date of Patent: Jun. 20, 2017

(54) SOLENOID VALVE

(71) Applicant: DENSO CORPORATION, Kariya, Aichi-pref. (JP)

(72) Inventors: Hiroyuki Harada, Kariya (JP); Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 88 days.

(21) Appl. No.: 14/713,200

(22) Filed: May 15, 2015

(65) Prior Publication Data

US 2015/0330514 A1 Nov. 19, 2015

(30) Foreign Application Priority Data

May 16, 2014 (JP) .................................. 2014-101991

(51) Int. Cl.
| | |
|---|---|
| *F02M 25/08* | (2006.01) |
| *F16K 1/52* | (2006.01) |
| *F16K 31/06* | (2006.01) |
| *F16K 31/12* | (2006.01) |

(52) U.S. Cl.
CPC .............. *F16K 1/526* (2013.01); *F02M 25/08* (2013.01); *F02M 25/089* (2013.01); *F02M 25/0836* (2013.01); *F16K 1/52* (2013.01); *F16K 31/06* (2013.01); *F16K 31/0655* (2013.01); *F16K 31/12* (2013.01); *F02M 2025/0845* (2013.01); *Y10T 137/7754* (2015.04); *Y10T 137/88062* (2015.04)

(58) Field of Classification Search
CPC ........... F02M 2025/0845; F02M 25/08; F02M 25/0836; F02M 25/089; F16K 1/52; F16K 1/526; F16K 31/06; F16K 31/0655; F16K 31/12; Y10T 137/88062; Y10T 137/7754
USPC ............. 137/614.21; 251/360, 361, 362, 363
See application file for complete search history.

(56) References Cited

U.S. PATENT DOCUMENTS

| | | | | |
|---|---|---|---|---|
| 1,401,879 | A * | 12/1921 | Comings | F16K 29/00 137/243.1 |
| 2,301,976 | A * | 11/1942 | Schellens | F16L 27/0841 137/270 |
| 2,633,862 | A * | 4/1953 | Dales | F16K 43/006 137/390 |
| 5,669,409 | A * | 9/1997 | Kettner | G05D 16/02 137/494 |
| 2013/0134339 | A1 | 5/2013 | Miura et al. | |
| 2015/0059711 | A1 | 3/2015 | Kishi | |

\* cited by examiner

*Primary Examiner* — William McCalister
(74) *Attorney, Agent, or Firm* — Nixon & Vanderhye P.C.

(57) ABSTRACT

A first valve chamber, which receives a valve assembly of a tank closing solenoid valve, and a second valve chamber, which receives a valve assembly of a pressure responsive valve, are formed between a first flow passage and a second flow passage of a first housing by fitting a second peripheral wall of a second housing into a radially inner side of a first peripheral wall of the first housing. Thereby, it is not required to heat-weld and bond between a connecting end surface of the first housing and a connecting end surface of the second housing.

12 Claims, 4 Drawing Sheets

SOLENOID VALVE

CROSS REFERENCE TO RELATED APPLICATION

This application is based on and incorporates herein by reference Japanese Patent Application No. 2014-101991 filed on May 16, 2014.

TECHNICAL FIELD

The present disclosure relates to a solenoid valve.

BACKGROUND

As an evaporative fuel processing system of a vehicle (e.g., an automobile), a known fuel tank sealing system closes a valve element of a tank sealing valve (a tank closing valve), which is placed between a fuel tank and a canister, to seal the fuel tank (see, for example, JP2013-113401A, which corresponds to US 2013/0134339 A1). This fuel tank sealing system includes the fuel tank, the tank sealing valve, the canister, and a purge control valve and is connected to an intake conduit communicated with a cylinder of an internal combustion engine that drives the vehicle.

The tank sealing valve includes a tank closing solenoid valve of a normally closed type (N/C) having a valve element that is held in a valve closed state except during a part of a driving period of the vehicle or during a fuel refill operation for filling fuel to the fuel tank. Furthermore, in a case where the fuel refill operation is sensed, the valve element of the tank closing solenoid valve is held in a valve open state from the time of sensing the fuel refill operation until an end of the fuel refill operation.

When the valve element of the tank closing solenoid valve is opened at the time of sensing the fuel refill operation, gas, which contains evaporative fuel, can be conducted from the fuel tank to the canister before the time of opening a fuel filler inlet of the vehicle. This is an operation for limiting release of the evaporative fuel from the fuel tank to the atmosphere. In order to effectively execute this operation, an opening operation of the fuel filler inlet needs to be prohibited. Therefore, there exists a waiting time period (a pressure release waiting time period) at the time of executing the fuel refill operation.

Furthermore, a tank interior pressure may be substantially increased during the time period of closing the valve element of the tank closing solenoid valve. In the state where the tank interior pressure is high, when the valve element of the tank closing solenoid valve is opened, a large quantity of the evaporative fuel, which is larger than an adsorbable quantity of the evaporative fuel that can be adsorbed by the canister per unit time, may flow from the fuel tank to the canister. That is, since the large quantity of the evaporative fuel, which exceeds the adsorbable quantity of the evaporative fuel that can be adsorbed by the canister per unit time, instantaneously flows from the fuel tank to the canister, the evaporative fuel, which breaks the canister, may possibly leak to the atmosphere.

Therefore, in the state where the tank interior pressure is relative high, a passing flow quantity of the evaporative fuel, which flows through a passing flow passage in the tank closing solenoid valve, is reduced to limit the leakage of the evaporative fuel from an atmosphere communication hole of the canister to the atmosphere. Furthermore, in a case where the tank interior pressure is relatively low, and thereby there is a no possibility for the evaporative fuel to leak to the atmosphere, it is required to flow a large quantity of the evaporative fuel from the fuel tank to the canister in order to rapidly release the pressure of the fuel tank.

In view of the above points, inventors of the present application have proposed and formed a tank sealing solenoid valve (a comparative example), in which a pressure responsive valve that changes an amount of stroke in response to a pressure of the evaporative fuel, is combined with a tank closing solenoid valve for the purpose of adjusting a flow quantity of the evaporative fuel from the fuel tank to the canister in response to a change in the tank interior pressure (this technique is not a prior art technique).

As shown in FIGS. 4A and 4B, the tank sealing solenoid valve of the comparative example includes a tank closing solenoid valve and a pressure responsive valve.

A first valve element 101 of the tank closing solenoid valve and a second valve element 102 of the pressure responsive valve are axially movably received in a hollow portion, which is formed between a first housing 103 made of synthetic resin and a second housing 104 made of synthetic resin. The first and second housings 103, 104 have a connecting portion, which airtightly connects between the first and second housings 103, 104 by thermal welding (heat welding).

The first and second housings 103, 104 have a first valve chamber 106, a second valve chamber 108, and an outlet port. The evaporative fuel is guided from an inlet port communicated with the fuel tank to the first valve chamber 106 through an inlet flow passage 105. The evaporative fuel is guided from the first valve chamber 106 to the second valve chamber 108 through a valve hole 107. The evaporative fuel is guided from the second valve chamber 108 to the outlet port through an outlet flow passage 110.

The first housing 103 has a first valve seat 111, which is configured into an annular form and is exposed to the first valve chamber 106. The second housing 104 has a second valve seat 112, which is configured into an annular form and is exposed to the second valve chamber 108.

The tank closing solenoid valve includes a solenoid actuator (hereinafter referred to as a solenoid), and a spring. The solenoid generates a magnetic attractive force that magnetically attracts a plunger toward a core upon energization of a coil of the solenoid. The spring urges the first valve element 101 against the first valve seat 111 (toward a first valve element closing side). The first valve element 101 is opened by the solenoid such that the first valve element 101 is lifted from the first valve seat 111 and opens the valve hole 107.

The pressure responsive valve includes a spring 113, which urges the second valve element 102 toward a side away from the second valve seat 112 (toward a second valve element opening side). Furthermore, during the valve opening time of the tank closing solenoid valve, the amount of stroke of the second valve element 102 from the second valve seat 112 is changed by balance between the pressure of the evaporative fuel guided into the second valve chamber 108 and the spring force of the spring 113. Therefore, the passing flow quantity of the evaporative flue is adjusted in response to the change in the amount of stroke of the second valve element 102.

When the plunger is magnetically attracted toward the core upon energization of the coil of the solenoid, the first valve element 101 is moved toward the valve opening side along with the plunger. That is, the first valve element 101 of the tank closing solenoid valve is lifted from the first valve seat 111 to open the valve hole 107.

When the first valve element 101 is opened in this way, the evaporative fuel is guided from the first valve chamber 106 to the second valve chamber 108 through the valve hole 107. At this time, in a case where the pressure of the evaporative fuel, which is guided into the second valve chamber 108, is substantially larger than the spring force of the spring 113, the second valve element 102 pushes the spring 113 to compress the spring 113, so that the second valve element 102 is seated against the second valve seat 112.

In this way, the evaporative fuel, which is guided into the second valve chamber 108, flows to the outlet flow passage 110 through a restriction hole (choking hole) 114 that extends through a center of the second valve element 102. At this time, since the passing flow quantity of the evaporative fuel is limited by the restriction hole 114, a flow quantity of the evaporative fuel, which is conducted from the fuel tank to the canister, becomes a small flow quantity.

Thereafter, when the tank interior pressure is reduced, the pressure of the evaporative fuel, which is guided from the first valve chamber 106 to the second valve chamber 108 through the valve hole 107, is reduced. When the pressure of the evaporative fuel, which is guided from the first valve chamber 106 to the second valve chamber 108 through the valve hole 107, becomes smaller than the spring force of the spring 113, the second valve element 102 is pushed back by the spring force of the spring 113. Therefore, in addition to the evaporative fuel, which passes through the restriction hole 114 toward the outlet flow passage 110, the fuel, which flows on the radially outer side of the second valve element 102 toward the flow passage 110, is added. Thus, the flow quantity of the evaporative fuel, which is guided from the fuel tank to the canister, is changed from the small flow quantity to a large flow quantity.

However, in the tank sealing solenoid valve of the comparative example, a connecting portion of the first housing 103, which receives the first valve element 101 in the first valve chamber 106, and a connecting portion of the second housing 104, which receives the second valve element 102 and the spring 113 in the second valve chamber 108, are abutted and are heat-welded and securely bonded together by a predetermined heat-welding and bonding method.

Therefore, a heat, which is generated at the time of heat-welding and bonding the connecting portion of the first housing 103 and the connecting portion of the second housing 104 together, may deform a valve seat surface of the first valve seat 111, against which the first valve element 101 of the tank closing solenoid valve is seated. Thus, in the case where the valve seat surface of the first valve seat 111 is deformed by the heat, a gas sealing performance of the first valve element 101 relative to the first valve seat 111 may possibly be deteriorated at a full closing time of the tank closing solenoid valve.

Furthermore, the heat, which is generated at the time of heat-welding and boding the connecting portion of the first housing 103 and the connecting portion of the second housing 104 together, may deform a spring seat surface, which holds the end of the spring 113 of the pressure responsive valve. In the case where the spring seat surface, which holds the end of the spring 113 of the pressure responsive valve, is deformed by the heat, the spring force of the spring 113 is changed from a preset value, and thereby flow quantity characteristics of the evaporative fuel relative to a change in the amount of stroke of the second valve element 102 may be varied from product to product.

SUMMARY

The present disclosure addresses the above disadvantages. According to the present disclosure, there is provided a solenoid valve including an opening and closing valve, a flow quantity adjusting valve, and a housing. The opening and closing valve is a solenoid-operated valve and includes a first valve element. A first valve seat is disposed in a first valve chamber, into which fluid is supplied. The first valve element is seatable against and is liftable away from the first valve seat to close and open a valve hole communicated with the first valve chamber. The flow quantity adjusting valve is a pressure-operated valve and includes a second valve element and a spring. The second valve element adjusts a flow quantity of the fluid, which flows through a second valve chamber that receives the fluid from the first valve chamber through the valve hole, in response to an amount of stroke of the second valve element relative to a second valve seat disposed in the second valve chamber during a valve opening time of the opening and closing valve. The spring urges the second valve element toward a valve opening side in an axial direction of the second valve chamber. The housing reciprocatably receives the first valve element in the first valve chamber and reciprocatably receives the second valve element in the second valve chamber. The housing includes a first housing and a second housing. The first housing is placed on a radially outer side of the first valve chamber and the second valve chamber in a radial direction, which is perpendicular to the axial direction. The second housing is loosely fitted into a radially inner side of the first housing and forms the first valve chamber, the second valve chamber and the valve hole in an inside of the second housing. One of the first housing and the second housing includes a spring seat, at which an end of the spring is held or secured.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings.

Figure 1:
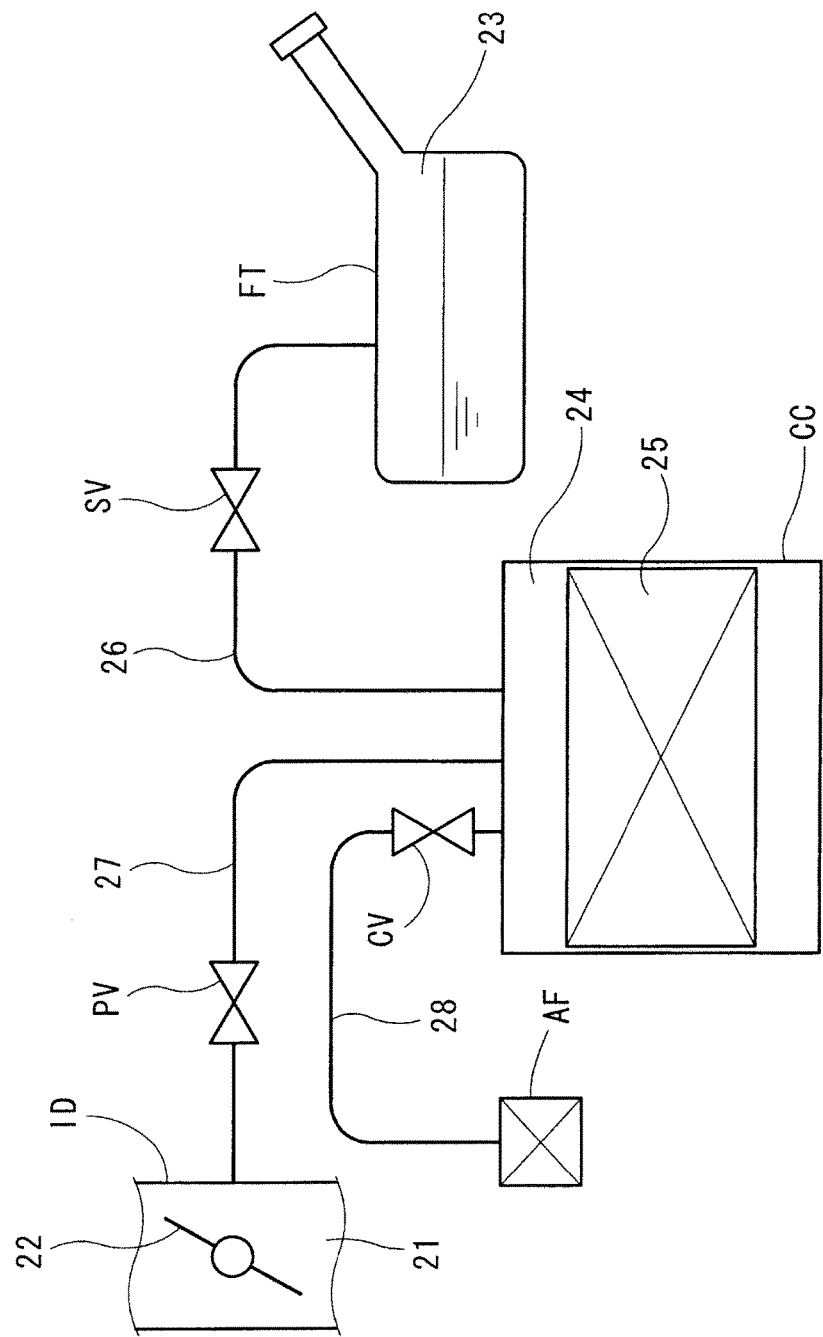
FIG. 1 is a schematic diagram showing a structure of an evaporative fuel processing system (a fuel tank sealing system) according to a first embodiment of the present disclosure.
Figure 2:
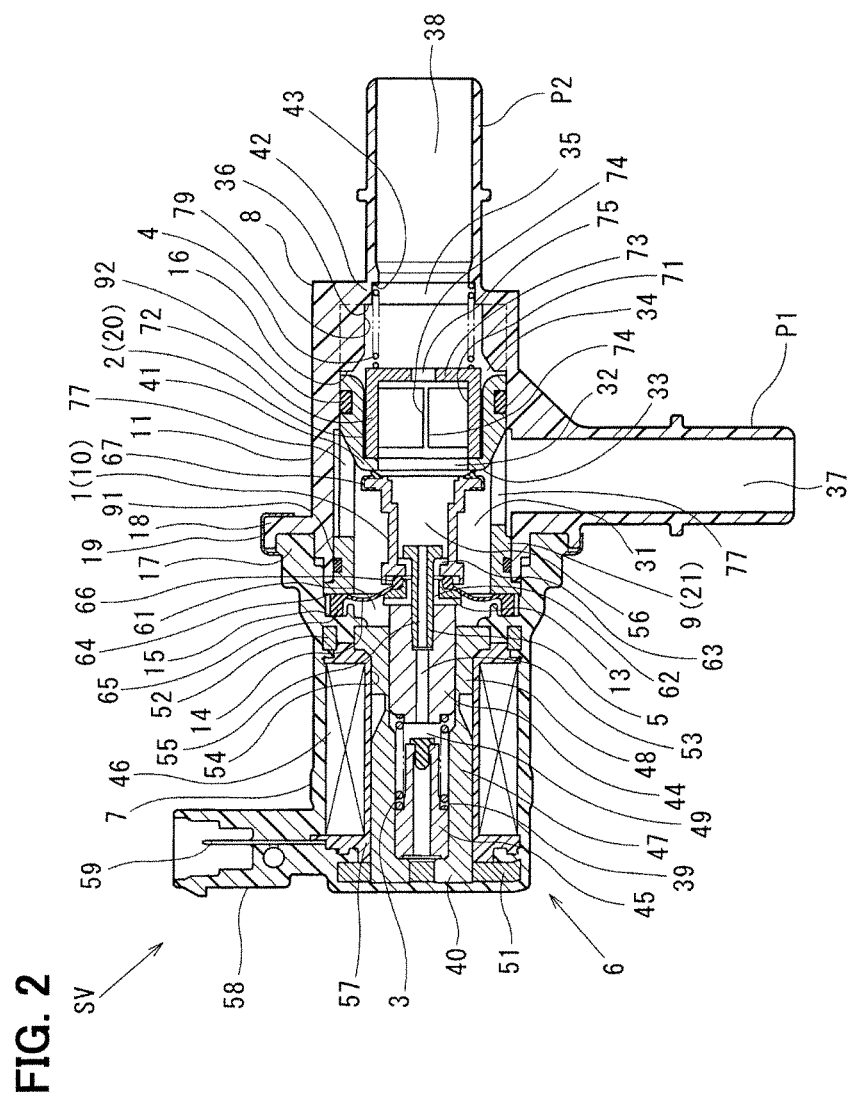
FIG. 2 is a cross-sectional view showing a tank sealing solenoid valve (a tank closing solenoid valve and a pressure responsive valve) used in the fuel tank sealing system according to the first embodiment.
Figure 3:
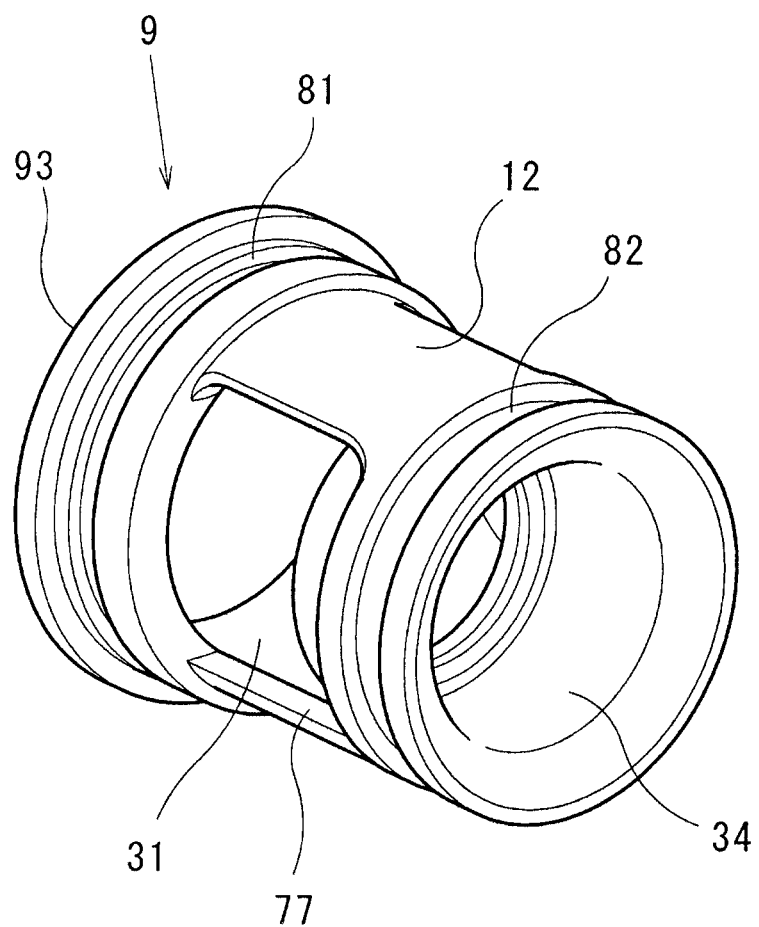
FIG. 3 is a perspective view of a second housing to be installed in an inside of a first housing according to the first embodiment.
Figure 4A:
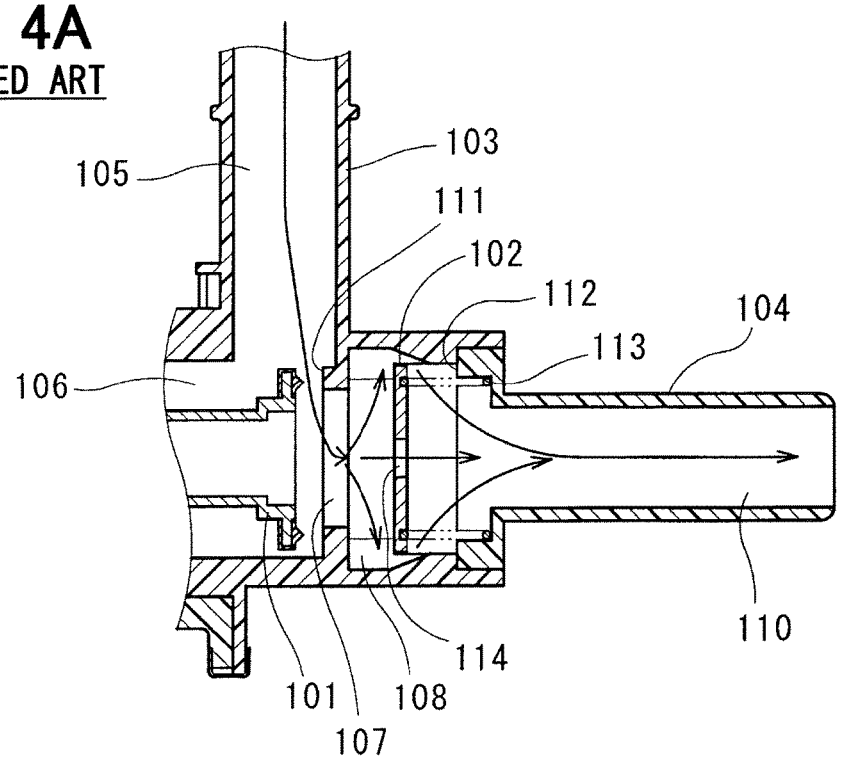
FIG. 4A is a partial cross-sectional view showing a second valve element of a pressure responsive valve held in a valve open state where the second valve element is lifted from a second valve seat in a comparative example.
Figure 4B:
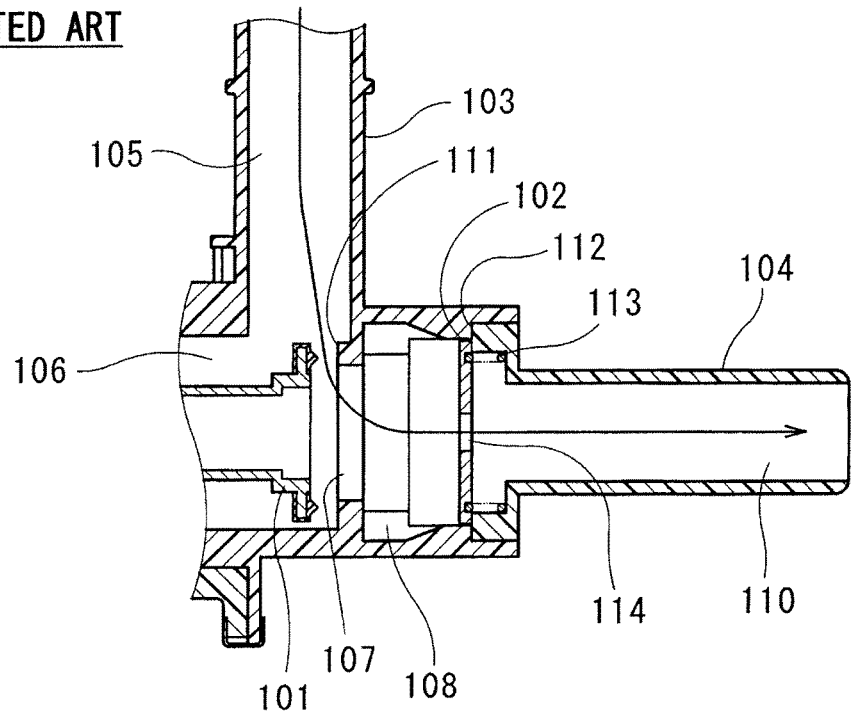
FIG. 4B is a partial cross-sectional view showing the second valve element of the pressure responsive valve held in a valve closed state where the second valve element is seated against the second valve seat in the comparative example.

FIGS. 1 to 3 show an evaporative fuel processing system that includes a tank sealing solenoid valve according to an embodiment of the present disclosure.

The evaporative fuel processing system of the present embodiment has a fuel tank sealing system that includes the tank sealing solenoid valve SV, which is placed between a fuel tank FT and a canister CC and seals the fuel tank FT when the tank sealing solenoid valve SV is closed. This fuel tank sealing system is installed in, for example, a hybrid vehicle (e.g., a hybrid automobile) that uses an internal combustion engine (hereinafter referred to as an engine) and an electric motor (hereinafter referred to as a motor) as drive sources for driving the hybrid vehicle.

The fuel tank sealing system includes the fuel tank FT, the tank sealing solenoid valve SV, the canister CC, a purge control valve PV, and a canister control valve CV and is connected to an intake conduit ID that is communicated with a combustion chamber of each of cylinders of the engine.

The tank sealing solenoid valve SV is a solenoid valve that is formed by assembling a pressure responsive valve (a flow quantity adjusting valve that is a pressure-operated type, i.e., a pressure-operated valve) 20 into the tank closing solenoid valve (an opening and closing valve that is a solenoid-operated type, i.e., a solenoid-operated valve) 10. The tank sealing solenoid valve SV includes a cup valve 1, a cup valve 2, a first spring 3, and a second spring 4. The cup valve 1 is a valve element of the tank closing solenoid valve 10. The cup valve 2 is a valve element of the pressure responsive valve 20. The first spring 3 urges the cup valve 1 in a valve closing direction of the cup valve 1. The second spring 4 urges the cup valve 2 in a valve opening direction of the cup valve 2.

Besides the cup valve 1 and the first spring 3, the tank closing solenoid valve 10 includes a solenoid actuator (hereinafter referred to as a solenoid) 6, a solenoid case 7, a first housing 8, a second housing 9 and a pressure canceling mechanism. The solenoid 6 drives the cup valve 1 in the valve opening direction of the cup valve 1 through a sleeve (pipe) shaft (joint, hereinafter referred to as a shaft) 5. The solenoid case 7 is made of synthetic resin and receives the solenoid 6. The first and second housings 8, 9 receive the cup valve 1 in a reciprocatable member. The pressure canceling mechanism cancels a pressure difference between an upstream side and a downstream side of the cup valve 1.

Besides the cup valve 2 and the second spring 4, the pressure responsive valve 20 includes the first and second housing 8, 9, which reciprocatably receives the cup valve 2. The first and second housings 8, 9 are commonly used in the tank closing solenoid valve 10 and the pressure responsive valve 20.

The amount of stroke of the pressure responsive valve 20 becomes small or zero (a zero stroke, at which the pressure responsive valve 20 is fully closed) to reduce the flow quantity of the evaporative fuel conducted from the fuel tank FT to the canister CC when a pressure of evaporative fuel, which is guided into a back pressure chamber (described later) and is applied to a pressure receiving wall (described later) in a valve closing direction of the pressure responsive valve 20, is equal to or larger than a predetermined valve. Furthermore, the amount of stroke of the pressure responsive valve 20 becomes large or full (a full stroke, at which the pressure responsive valve 20 is fully opened) to increase the flow quantity of the evaporative fuel conducted from the fuel tank FT to the canister CC when the pressure of the evaporative fuel, which is guided into the back pressure chamber and is applied to the pressure receiving wall in the valve closing direction of the pressure responsive valve 20, is smaller than the predetermined value.

The tank sealing solenoid valve SV is inserted and is placed between a first flow passage 37 and a second flow passage 38 described later. Furthermore, in the tank sealing solenoid valve SV, a second peripheral wall 12 of the second housing 9 is loosely fitted into a radially inner side of the first peripheral wall 11 of the first housing 8 instead of press fitting the second peripheral wall 12 of the second housing 9 into an inner side of the first peripheral wall 11 of the first housing 8. The second housing 9 is clamped and held between a first annular step 15 of the solenoid case 7 and a second annular step 16 of the first housing 8 through a thick wall portion (described later) of a diaphragm 14, which is held between the cup valve 1 and a cylindrical tubular collar 13.

In the tank sealing solenoid valve SV, the solenoid 6 and a valve unit (including the tank closing solenoid valve 10 and the pressure responsive valve 20) are joined together by abutting a connecting end surface of a connecting flange 17 of the solenoid case 7 and an connecting end surface a connecting flange 18 of the first housing 8 with each other, installing a metal plate 19 over both of the connecting flange 17 and the connecting flange 18, and plastically deforming the metal plate 19 against the connecting flanges 17, 18 to securely join the connecting flange 17 and the connecting flange 18 together.

The engine is a vehicle drive engine, which is installed in, for example, the vehicle, such as the hybrid vehicle, and includes a plurality of cylinders. In the present embodiment, a gasoline engine is used as this engine. The gasoline engine of the present embodiment combusts a mixture gas (a mixture of intake air filtered through an air cleaner and fuel injected from an injector) in a combustion chamber of each cylinder. Thereby, gasoline is used as fuel of the engine.

An intake conduit (an intake duct) ID, which forms an intake passage 21 for conducting intake air passed through an air cleaner, is connected to an intake port of each cylinder of the engine. Furthermore, an undepicted exhaust conduit (an undepicted exhaust duct), which forms an exhaust passage for conducting exhaust gas outputted from the combustion chamber of each cylinder, is connected to an exhaust port of each cylinder of the engine.

A throttle valve (an intake valve) 22, which adjusts a flow quantity of intake air conducted through the intake passage 21 communicated with the combustion chamber of each cylinder of the engine, is installed in the intake conduit ID.

Furthermore, the fuel tank sealing system is a fuel-supply-dedicated canister system that opens the cup valve 1 of the tank sealing solenoid valve SV to recover the evaporative fuel, which is generated in a fuel storage chamber 23 of the fuel tank FT, into an adsorption chamber 24 of the canister CC when a refill operation (a fuel supply operation) for supplying the fuel to the fuel tank FT, which stores the liquid fuel (the fuel of the internal combustion engine), is performed.

At a non-refill time (i.e., a time, during which the fuel is not refilled, i.e., is not supplied into the fuel tank FT), such as a time of driving the vehicle (e.g., the hybrid automobile) or a time of stopping the vehicle, during which refilling of fuel into the fuel tank FT is not performed, the fuel-supply-dedicated canister system can maintain a closed state of the cup valve 1 of the tank sealing solenoid valve SV unless the pressure of the fuel storage chamber 23 of the fuel tank FT is increased to a predetermined value or higher.

Thereby, the evaporative fuel, which has been adsorbed and held by an adsorbent 25 received in the adsorption chamber 24 of the canister CC, can be effectively purged toward the intake passage 21 of the intake conduit ID at the non-refill time.

The fuel tank FT includes a tank case (also referred to as a fuel tank main body) and a filler pipe. The tank case has a predetermined volume. The filler pipe supplies the liquid fuel to the fuel storage chamber 23 of the tank case. The fuel storage chamber 23, which stores the liquid fuel to be supplied to the injectors installed to respectively correspond with the cylinders of the engine, is formed in the inside of the tank case.

Furthermore, the filler pipe is connected to a predetermined portion (an upper portion) of the tank case in a state where the fuel tank FT is installed to the vehicle. A fuel supply passage, which supplies fuel from a fuel filler inlet of the vehicle into the fuel storage chamber 23, is formed in an inside of the filler pipe. Furthermore, a fuel cap (not shown), which closes the fuel filler inlet, is installed to the fuel filler inlet of the filler pipe.

Furthermore, a fuel pump (not shown), which pumps the liquid fuel to the injectors, is placed in the fuel storage chamber 23 of the tank case. Furthermore, a pressure sensor (not shown), which senses a pressure (a pressure of the evaporative fuel that is also referred to as a tank interior pressure) of a space located above a surface of the liquid fuel in the fuel storage chamber 23, is installed to the tank case.

The pressure sensor is installed to an inner surface of the tank case and outputs a pressure signal, which corresponds to the pressure (the tank interior pressure) of the space above the surface of the liquid fuel in the fuel storage chamber 23 of the tank case, to an engine control unit (an electronic control device or unit that will be hereinafter abbreviated as ECU).

The canister CC includes a canister case, which has a predetermined internal volume. The adsorbent (e.g., activated carbon) 25, which adsorbs the evaporative fuel, is received in the inside of the adsorption chamber 24 of the canister case.

A tank (inlet) port, a purge (outlet) port and an atmosphere port (atmosphere communicated hole) are formed in the canister.

A vapor conduit (a first fluid flow passage conduit), in which a first fuel vapor flow passage 26 is formed, is connected to the tank port. A purge conduit (a second fluid flow passage conduit), in which a second fuel vapor flow passage 27 is formed, is connected to the purge port.

The canister CC is communicated with a purge gas inlet port of the intake conduit ID through the second fuel vapor flow passage 27 of the purge conduit. The purge conduit is connected to the intake conduit ID at a location, which is on a downstream side (an engine's intake port side) of the throttle valve 22 in a flow direction of the intake air. The purge control valve PV, which adjusts a purge quantity of the evaporative fuel (evaporative gas, purge gas), is installed in the purge conduit.

The vapor conduit is connected to an upper portion of the tank case of the fuel tank FT. The tank sealing solenoid valve SV, which closes and opens a first fuel vapor flow passage 26 formed in the vapor conduit, is installed in the vapor conduit.

The purge conduit is connected to the intake conduit ID at the location, which is on the downstream side (the engine's intake port side) of the throttle valve 22 in the flow direction of the intake air. The purge control valve PV, which adjusts the purge quantity of the purge gas including the evaporative fuel (evaporative gas), is installed in the purge conduit.

Furthermore, an atmospheric gas introducing conduit, in which an atmospheric gas introducing flow passage 28 is formed, is connected to the atmosphere port of the canister. An air filter AF, which filters the air to be introduced into the adsorption chamber 24 of the canister CC, is installed in an atmosphere gas introducing port of the atmosphere gas introducing conduit. The canister control valve CV, which closes an atmosphere communication hole of the canister CC in response to a need, is installed in the atmospheric gas introducing conduit.

In the present embodiment, during the time of driving the hybrid vehicle, which has the fuel tank sealing system, with the electric motor, a negative pressure is not generated in the intake passage 21 of the intake conduit ID. Therefore, the evaporative fuel, which is adsorbed by the adsorbent 25 in the adsorption chamber 24 of the canister CC, cannot be fed to the intake passage 21 of the intake conduit ID. Therefore, in order to limit the overflow of the evaporative fuel, which occurs upon excess adsorption of the evaporative fuel by the adsorbent 25 in the adsorption chamber 24, the cup valve 1 of the tank sealing solenoid valve SV, which is installed in the first fuel vapor flow passage 26 between the fuel storage chamber 23 of the fuel tank FT and the adsorption chamber 24 of the canister CC, is closed (fully closed) to block (seal) the communication between the fuel tank FT and the canister CC.

Furthermore, in the fuel tank sealing system, when a driver of the vehicle performs a fuel filling operation, i.e., when the driver of the vehicle operates a fuel filler inlet opener lever (not shown), which is provided with, for example, an opener switch (not show), at the time of refilling the fuel into the fuel tank FT, an inlet open signal is inputted to the ECU, which controls the fuel tank sealing system. When the ECU receives the inlet open signal, the ECU opens (fully opens) the cup valve 1 of the tank sealing solenoid valve SV. Therefore, the pressure of the fuel tank FT can be dropped to the atmospheric pressure. Thus, even when the fuel cap is removed to open the fuel filler inlet, it is possible to limit release of the evaporative fuel from the fuel tank FT to the outside air (the atmosphere) through the fuel filler inlet.

Next, details of the tank sealing solenoid valve SV of the present embodiment will be described with reference to FIGS. 1 to 3.

The tank sealing solenoid valve SV is installed in the fuel tank sealing system. The tank sealing solenoid valve SV includes the tank closing solenoid valve 10 and the pressure responsive valve 20 (the flow quantity adjusting valve that is the pressure-operated type, i.e., the pressure-operated valve). The tank closing solenoid valve 10 is the solenoid-operated type (i.e., the solenoid-operated valve) and can tightly seal the fuel tank FT at the non-refill time (i.e., the time, during which the fuel is not refilled, i.e., is not supplied into the fuel tank FT), such as the time of driving the vehicle (e.g., the hybrid automobile) or the time of stopping the vehicle, during which refilling of fuel into the fuel tank FT is not performed. The pressure responsive valve 20 is operated in response to the pressure (the tank interior pressure) of the evaporative fuel, which is a pressure fluid generated in the fuel storage chamber 23 of the fuel tank FT during the valve opening time of the tank closing solenoid valve 10.

As shown in FIGS. 1 and 2, the tank sealing solenoid valve SV has a housing, which has a hollow interior in an inside thereof and is placed in the first fuel vapor flow passage 26 formed in the vapor conduit that connects between the fuel storage chamber 23 of the fuel tank FT and the adsorption chamber 24 of the canister CC.

The housing of the tank sealing solenoid valve SV is formed by three separated cases, which includes the solenoid case 7 and first and second housings (valve cases) 8, 9. The solenoid case 7 is made of the synthetic resin. The first and second housings 8, 9 are made of the synthetic resin and form an evaporative fuel flow passage that conducts the evaporative fuel.

The first housing 8 includes the first peripheral wall 11, the second annular step 16, the connecting flange (also referred to as a connection) 18, an inlet pipe P1, and an outlet pipe P2. The first peripheral wall 11 linearly extends in the axial direction, which coincides with the moving direction of the cup valves 1, 2. The second annular step 16 is formed at a downstream side portion of the first peripheral wall 11. The connecting flange 18 is configured into an annular form and is formed in an outer peripheral part of an upstream side portion of the first peripheral wall 11. The inlet pipe P1 linearly outwardly extends from the outer peripheral surface of the first peripheral wall 11 in a radial direction that is perpendicular to the axial direction of the first peripheral wall 11. The outlet pipe P2 linearly outwardly extends from a downstream end of the first peripheral wall 11 in the axial direction of the first peripheral wall 11.

A first valve chamber 31, a first valve hole 32, and a first valve seat 33 are formed in the first and second housings 8, 9. The first valve chamber 31 receives the cup valve 1 in a manner that enables reciprocating movement (reciprocation) of the cup valve 1 in the axial direction of the cup valve 1. The first valve hole 32 is exposed to the first valve chamber 31, and the evaporative fuel can pass through the first valve hole 32. The first valve seat 33 is configured into an annular form and surrounds the first valve hole 32.

A second valve chamber 34, a second valve hole 35, and a second valve seat 36 are formed in the first and second housings 8, 9. The second valve chamber 34 receives the cup valve 2 in a manner that enables reciprocating movement of the cup valve 2 in the axial direction of the cup valve 2. The second valve hole 35 is exposed to the second valve chamber 34, and the evaporative fuel can pass through the second valve hole 35. The second valve seat 36 is configured into an annular form and surrounds the second valve hole 35.

The inlet pipe P1 is a first flow passage conduit (an entrance pipe), which is configured into a tubular form and projects from the first peripheral wall 11, which is the case main body of the first housing 8, toward the outside (the fuel tank side). The inlet pipe P1 is formed integrally and seamlessly with the first peripheral wall 11 in such a manner that the inlet pipe P1 projects outward from the outer peripheral surface of the first peripheral wall 11 in the radial direction. The first flow passage 37 is formed in the inside of the inlet pipe P1 at a location, which is on the upstream side of the first valve chamber 31 in the gas flow direction.

The outlet pipe P2 is a second flow passage conduit (an exit pipe), which is configured into a tubular form and projects from the first peripheral wall 11 (the case main body of the first housing 8) toward the outside (the canister side). The outlet pipe P2 is formed integrally and seamlessly with the first peripheral wall 11 in such a manner that the outlet pipe P2 projects outward from an end surface of the first peripheral wall 11 in the axial direction. Furthermore, the second flow passage 38 is formed in an inside of the outlet pipe P2 at a location, which is on the downstream side of the second valve chamber 34 in the gas flow direction.

The first valve seat 33 is formed in a first valve chamber 31 side surface of the first partition wall 41 of the second housing 9. Furthermore, the second valve seat 36 is formed in a second valve chamber 34 side surface of a second partition wall 42 of the first and second housings 8, 9.

A first spring seat 39, which is configured into an annular form, is formed in an annular step of a plunger stopper (hereinafter referred to as a stopper) 45 that is a constituent component (a functional component) of the solenoid 6. A corresponding end of the first spring 3 is held or secured to the first spring seat 39.

A plurality of ridge guides (not shown) is formed in a first valve chamber 31 side inner peripheral surface of the second peripheral wall 12 of the second housing 9 such that the ridge guides support (guide) the cup valve 1 in a manner that enables reciprocating movement of the cup valve 1 in the axial direction of the first valve chamber 31.

A plurality of ridge guides (described later) is formed in a downstream end part of the first peripheral wall 11 of the first housing 8 such that the ridge guides support (guide) the cup valve 2 in a manner that enables reciprocating movement of the cup valve 2 in the axial direction of the second valve chamber 34. A second spring seat 43, which is configured into an annular form, is formed in an annular step placed between the outlet pipe P2 and the first peripheral wall 11 in the first housing 8. A corresponding end of the second spring 4 is held or secured to the second spring seat 43.

The first and second housings 8, 9 of the present embodiment will be described later in detail.

Next, the tank closing solenoid valve 10 of the present embodiment will be briefly described with reference to FIGS. 1 and 2.

The tank closing solenoid valve 10 includes the cup valve 1, the first spring 3, the solenoid 6, and the solenoid case 7. The first valve seat 33 is exposed to the first valve chamber 31, to which the evaporative fuel is guided from the fuel tank FT, and the cup valve 1 is seatable against and is liftable away from the first valve seat 33 to close and open the first valve hole 32 that is communicated with the first valve chamber 31. The first spring 3 generates a resilient force (a spring force) to urge the cup valve 1 toward a closing side (the valve closing direction of the cup valve 1) in the axial direction of the first valve chamber 31. The solenoid 6 drives the cup valve 1 toward an opening side (the valve opening direction of the cup valve 1) in the axial direction of the first valve chamber 31. The solenoid case 7 receives and holds the solenoid 6.

The first spring 3 is received and held between the plunger 44, which is operated in response to a magnetic attractive force of the solenoid 6, and the stopper 45, which limits a maximum stroke of the plunger 44, in such a manner that the first spring 3 is expandable and contractible. The first spring 3 is a compression coil spring that generates an urging force (a spring force) against the plunger 44 to urge the cup valve 1 against the first valve seat 33.

A plunger receiving chamber 49 is formed in an inside of a radially inner side stator core 40 (including a stator core segment 47 and a stator core segment 48), which is configured into a tubular form and forms a magnetic path on a radially inner side of a coil 46 that is spirally wound. The stator core segment 47 and the stator core segment 48 are formed integrally, and the stator core segment 47 is placed on a side of the stator core segment 48, which is opposite from the cup valve 1 in the axial direction. In the plunger receiving chamber 49, the first spring 3 is placed and held between the annular step (a plunger annular end surface, a spring seat) of the plunger 44 and the annular step (a stopper annular end surface, a spring seat) of the stopper 45 in such a manner that the first spring 3 is held in a compressed state where the first spring 3 is compressed in the axial direction.

The solenoid 6 is a solenoid actuator that is received in the solenoid case 7 and drives the cup valve 1 toward one side (the valve opening direction of the cup valve 1) in the axial direction (reciprocating direction) of the first valve chamber 31 through the shaft 5 made of a non-magnetic material.

Specifically, the solenoid 6 (the solenoid actuator) includes the first spring 3, the plunger 44, the stopper 45, the coil 46, the stator core 40 (including the stator core segment 47 and the stator core segment 48), a yoke 51 and a ring core 52. When the coil 46 is energized, the solenoid 6 (the solenoid actuator) forms the magnetic circuit, which includes a movable body (the plunger 44) and a stator (the stator core 40, the yoke 51, and the ring core 52), to magnetically attract the plunger 44 toward the stator core segment 47 side and thereby to drive the cup valve 1 in the axial direction of the shaft 5.

The plunger 44 is fitted and is received on the radially inner side of the stator core segment 48 of the stator core 40 in such a manner that the plunger 44 is reciprocatable and slidable in a solenoid axial direction, which is an axial direction of the solenoid 6. The plunger 44 is a movable core (a moving core), which is magnetically attracted toward the one side in the solenoid axial direction by the magnetic force of the coil 46.

Furthermore, the plunger 44 includes a contact surface, which contacts an end surface of a cylindrical tubular collar 13, and a plunger breathing hole 53, which opens in the contact surface of the plunger 44 and linearly extends from the opening of the breathing hole 53 toward a deep side in the axial direction.

The plunger breathing hole 53 is formed to ensure flow of a gas (e.g., evaporative fuel) of a plunger back space (a volume variable portion of the plunger receiving chamber 49) in response to displacement of the plunger 44 in a guide hole 54 of the stator core segment 48 of the stator core 40. The volume variable portion of the plunger receiving chamber 49 communicates between the plunger receiving chamber 49 and an inside (a hollow portion 56 that is an axial space) of the cup valve 1 through an inside (a shaft breathing hole 55 that is an axial space) of the shaft 5.

A press fitting hole, into which an axial base end portion of the shaft 5 is press fitted, is formed in the first valve chamber side of the plunger breathing hole 53.

The spring force of the first spring 3 urges the plunger 44 together with the cup valve 1 and the shaft 5 toward the first valve seat 33. Furthermore, the spring is formed in the annular step of the plunger 44 to hold or secure the end of the first spring 3.

The stopper 45 holds a limiting portion (a cushion rubber), which limits a moving distance (an amount of full stroke) of the cup valve 1, the shaft 5 and the plunger 44 in the axial direction. The stopper 45 is fitted into a center hole of the stator core segment 47 of the stator core 40. Furthermore, the spring seat 39 is formed in the annular step of the stopper 45 to hold or secure the end of the first spring 3.

The coil 46 is a magnetic flux generating means (a magnetic force generating means) that generates a magnetic force for magnetically attracting the plunger 44 to a magnetically attracting portion of the stator core segment 47 when the electric power is supplied to the coil 46 (i.e., when the electric current is supplied to the coil 46, i.e., when the coil 46 is energized with the electric current). The coil 46 is a solenoid coil that is formed by winding an electrically conductive wire, which is covered with a dielectric film, around a cylindrical tubular portion of a coil bobbin (hereinafter referred to as a bobbin) 57 made of dielectric synthetic resin (a primary molded resin portion, or a molded resin portion).

The coil 46 drives the cup valve 1, the shaft 5 and the plunger 44 toward the one side (the valve opening direction of the cup valve 1) with the magnetic force generated upon energization of the coil 46.

In the solenoid 6 of the present embodiment, when the coil 46 is energized, there is formed the magnetic circuit, in which the magnetic flux is concentrated and passes through the plunger 44, the stator core 40 (including the stator core segments 47, 48), the yoke 51 and the ring core 52.

In the solenoid 6 of the present embodiment, when the coil 46 is energized (turned on), the cup valve 1, the shaft 5, the cylindrical tubular collar 13, the diaphragm 14 and the plunger 44 are stroked from an initial position (a default position) toward one side (until reaching, for example, a full opening position) in the solenoid axial direction against the spring force of the first spring 3.

Furthermore, when the energization of the coil 46 is stopped (turned off), the cup valve 1, the shaft 5, the cylindrical tubular collar 13, the diaphragm 14 and the plunger 44 are returned to the default position by the spring force of the first spring 3.

The stator of the present embodiment includes the radially inner side stator core 40 (including the stator core segments 47, 48), a radially outer side stator core (an undepicted cylindrical tubular portion of the yoke 51), a distal end side stator core (an annular distal end yoke of the yoke 51), and a base end side stator core (the ring core 52). The radially inner side stator core 40 forms the magnetic path on the radially inner side of the coil 46. The radially outer side stator core forms the magnetic path on the radially outer side of the coil 46. The distal end side stator core covers one end side (a distal end side) of the coil 46 in the axial direction. The base end side stator core covers the other end side (a base end side) of the coil 46 in the axial direction.

The stator core 40 (including the stator core segments 47, 48) is made of magnetic metal (e.g., a ferromagnetic material, such as iron), which is magnetized upon energization of the coil 46. The guide hole 54, which has a circular cross section and reciprocatably and slidably supports the plunger 44, is formed at the radially inner side of the stator core segments 47, 48 of the stator core 40. A slide surface, along which an outer peripheral surface of the plunger 44 directly slides, is formed in an inner peripheral surface of the stator core segment 48.

The magnetically attracting portion (the conical surface configured into the truncated cone shape) is formed in the annular base end surface of the stator core segment 47 to magnetically attract the plunger 44 toward the distal end side in the solenoid axial direction. The magnetically attracting portion is an opposing portion, which is opposed to the end surface of the plunger 44 and is spaced from the end surface of the plunger 44 by a predetermined axial distance when the energization of the coil 46 is stopped (turned off).

Furthermore, in the stator core 40, a magnetic resistance portion (a thin wall portion) is formed between the magnetically attracting portion of the stator core segment 47 and the stator core segment 48 to reduce the flow of the magnetic flux between the magnetically attracting portion of the stator core segment 47 and the stator core segment 48.

The yoke 51 and the ring core 52 are made of magnetic metal (e.g., a ferromagnetic material, such as iron), which is magnetized when the coil 46 is energized. The annular distal end yoke of the yoke 51 covers the distal end side of the coil 46 in the axial direction to close the distal end side of the coil 46 in an annular form. The ring core 52 covers the base end side of the coil 46 in the axial direction to close the base end side of the coil 46 in an annular form.

The solenoid case 7 receives the respective constituent components of the solenoid 6. The solenoid case 7 includes an external connector 58 to connect a pair of coil end leads, which are pulled out from the coil 46, to an external circuit (e.g., an external electric power source or an external control circuit, such as an ECU). The solenoid case 7 covers and protects the outer peripheral portion of the coil 46 and an electrical connection between each coil end lead of the coil 46 and a corresponding one of terminals 59.

A cylindrical tubular portion and the connector case are formed in the solenoid case 7. The cylindrical tubular portion of the solenoid case 7 covers the two axial ends and the radially outer side of the coil 46 and surrounds the coil 46 and the bobbin 57 in the circumferential direction. The connector case of the solenoid case 7 receives the terminals 59 such that the distal end sides (external connection ends) of the terminals 59 are exposed from the connector case.

Next, the pressure canceling mechanism of the tank closing solenoid valve 10 will be briefly described with reference to FIG. 2.

In a state where the cylindrical tubular collar 13 is engaged with the end surface of the cup valve 1 through the diaphragm 14 and is also engaged with the end surface of the plunger 44, the cylindrical tubular collar 13 is connected to the cup valve 1 and the plunger 44 through the shaft 5 in a manner that enables integral movement of the cylindrical tubular collar 13 together with the cup valve 1, the plunger 44 and the shaft 5.

The cylindrical tubular collar 13 includes a pressure canceling passage 62 between the cylindrical tubular collar 13 and the end surface of the plunger 44. The pressure canceling passage 62 communicates between the hollow portion 56 of the cup valve 1 and a space (a pressure canceling chamber 61) located on a radially outer side of the plunger 44.

The pressure canceling passage 62 is communicated with the hollow portion 56 of the cup valve 1 through a communication passage 63 formed between an inner peripheral portion of the cup valve 1 and an outer peripheral portion of the shaft 5. The pressure canceling passage 62 includes an axial hole, which extends in an axial direction of the cylindrical tubular collar 13, and a plurality of radial holes, which radially outwardly extend from the axial hole. A center part of the axial hole has a function of an insertion hole that extends through the cylindrical tubular collar 13 in the axial direction of the cylindrical tubular collar 13 while the shaft 5 extends through the insertion hole in a state where two axial ends of the shaft 5 project from two end surfaces, respectively, of the cylindrical tubular collar 13.

The shaft 5 is a connecting member that is made of the non-magnetic material and is configured into a hollow tubular form to connect the cup valve 1, the plunger 44 and the cylindrical tubular collar 13 in a manner that enables integral movement of the cup valve 1, the plunger 44 and the cylindrical tubular collar 13. The shaft 5 conducts the drive force of the plunger 44, which is exerted toward one side in the axial direction of the plunger 44, to the cup valve 1. The shaft 5 also conducts the urging force of the first spring 3, which is applied to the plunger 44, to the cup valve 1.

Furthermore, a fitting shaft portion, which is press fitted into the press fitting hole (large diameter hole) of the plunger breathing hole 53 of the plunger 44, is formed at the base end portion of the shaft 5.

Furthermore, a projecting shaft part, which projects into the hollow portion 56 of the cup valve 1, is formed at an axial distal end side of the shaft 5. A flange, which is configured into an annular form and forms the hollow portion 56, is formed at an outer peripheral surface of a distal end section of the projecting shaft part of the shaft 5.

The diaphragm 14 is made of a rubbery elastic material (synthetic rubber) and is configured into an annular thin film form. The diaphragm 14 includes a resiliently deformable portion that has a through-hole, which extends through a center part of the resiliently deformable portion in the axial direction (a thickness direction of the center part of the resiliently deformable portion). The diaphragm 14 is resiliently deformably received in the hollow portion of the housing.

The diaphragm 14 partitions the hollow portion, which is formed between the first housing 8 and the solenoid case 7, into the first valve chamber 31 and the pressure canceling chamber 61. The first valve chamber 31 is formed on the outer side of the hollow portion 56 of the cup valve 1. The pressure canceling chamber 61 is blocked from the outside of the first housing 8 and the solenoid case 7.

The pressure canceling chamber 61 is communicated with the first valve chamber 31 through the pressure canceling passage 62, the communication passage 63, and the hollow portion 56.

In the diaphragm 14, a radially outer peripheral edge portion, which has a thickness larger than a thickness of the resiliently deformable portion, is formed on a radially outer side of the resiliently deformable portion. The radially outer peripheral edge portion of the diaphragm 14 is an outer peripheral seal portion 65, which is configured into an annular form and airtightly seals a gap between the first annular step 15 of the solenoid case 7 and an annular end surface 64 of the second housing 9.

In the diaphragm 14, a radially inner peripheral edge portion, which has a thickness larger than the thickness of the resiliently deformable portion, is formed on a radially inner side of the resiliently deformable portion. The radially inner peripheral edge portion of the diaphragm 14 is an inner peripheral seal portion 66, which airtightly seals a gap between an annular end surface of the cup valve 1 and an annular end surface of the cylindrical tubular collar 13.

Next, the cup valve 1 of the tank closing solenoid valve 10 of the present embodiment will be described in detail with reference to FIG. 2.

The cup valve 1 is made of synthetic resin and is configured into a predetermined cup form. The cup valve 1 is a first valve element of a solenoid-operated type, which is driven by the solenoid 6. The cup valve 1 is received in the first valve chamber 31 of the second housing 9 in a manner that enables reciprocating movement of the cup valve 1 in the axial direction of the first valve chamber 31.

The cup valve 1 includes a valve seat surface, which is configured into an annular form and is seatable against the first valve seat 33. A seal rubber 67, which is made of a rubbery elastic material, is fixed to the valve seat surface of the cup valve 1.

The hollow portion 56 is formed in the inside of the cup valve 1. The cup valve 1 includes a sleeve, which surrounds the hollow portion 56 in the circumferential direction.

An inside of the sleeve of the cup valve 1 is partitioned into the hollow portion 56 and the first valve chamber 31. Two opposed ends of the hollow portion 56 are opened. The hollow portion 56 is communicated with the pressure canceling chamber 61 through a through-hole, which is formed at one end of the sleeve of the cup valve 1, and the pressure canceling passage 62. Furthermore, the hollow portion 56 is communicated with the first valve chamber 31 and the first valve hole 32 through a cup opening, which is formed at the other end of the cup valve 1, which is opposite from the one end of the cup valve 1.

Next, details of the pressure responsive valve 20 of the present embodiment will be described with reference to FIG. 2.

The pressure responsive valve 20 includes the cup valve 2 and the second spring 4. The cup valve 2 adjusts a passing flow quantity of the evaporative fuel, which flows through the second valve chamber 34, in response to the amount of stroke of the cup valve 2 relative to the second valve seat 36 disposed in the second valve chamber 34, into which the evaporative fuel is guided from the first valve chamber 31 through the first valve hole 32, during the valve opening time of the cup valve 2 of the tank closing solenoid valve 10. The second spring 4 generates a resilient force (a spring force), which urges the cup valve 2 toward an opening side (a valve opening direction of the cup valve 2) in the axial direction of the second valve chamber 34.

The cup valve 2 is made of synthetic resin and is configured into a predetermined cup form. The cup valve 2 is a second valve element of a pressure-operated type that adjusts a passing flow quantity of the evaporative fuel, which flows through the second valve chamber 34 and the second valve hole 35 in response to a change in the amount of stroke of the cup valve 2 upon occurrence of a change in the amount of stroke of the cup valve 2 induced by balance between the pressure of the evaporative fuel, which is guided from the first valve chamber 31 to the second valve chamber 34 through the first valve hole 32, and the spring force of the second spring 4 during the valve opening time of the tank closing solenoid valve 10.

The cup valve 2 includes a back pressure chamber (a pressure chamber) 71, a tubular wall 72, and a pressure receiving wall (a closing wall) 73. The back pressure chamber 71 is formed in an inside of the cup valve 2, and a pressure of the evaporative fuel is guided from the first valve chamber 31 to the back pressure chamber 71 through the first valve hole 32. A second valve chamber side of the tubular wall 72 is opened, and the back pressure chamber 71 is formed in an inside of the tubular wall 72. The pressure receiving wall 73 closes an opposite side of the tubular wall 72, which is opposite from the second valve chamber, and the pressure receiving wall 73 receives the pressure of the evaporative fuel, which is guided into the second valve chamber 34, particularly the back pressure chamber 71.

The back pressure chamber 71 is an axial hole that extends from the first valve hole 32 side opening (the cup opening) to the pressure receiving wall 73 located at a deep side of the axial hole. The back pressure chamber 71 receives the pressure (the back pressure of the cup valve 2) of the evaporative fuel, which is exerted against the pressure receiving wall 73 of the cup valve 2 in the valve closing direction of the cup valve 2 (exerted toward a side where the cup valve 2 is urged against the second valve seat 36, i.e., the closing side). The back pressure chamber 71 is communicated with the first valve hole 32 and the second valve chamber 34 through the cup opening of the tubular wall 72 formed at the one end side of the tubular wall 72.

A plurality of lateral holes 74 is formed in the tubular wall 72 such that each of the lateral holes 74 opens in a corresponding radial direction that is perpendicular to the axial direction of the back pressure chamber 71. The lateral holes 74 are inside-to-outside communication holes that communicate between the inside and the outside of the tubular wall 72. The lateral holes 74 are arranged one after another at predetermined intervals (e.g., equal intervals) in a circumferential direction of the tubular wall 72. The back pressure chamber 71 is communicated with an upstream side portion of the second valve chamber 34 (a portion of the second valve chamber 34 located on an upstream side of the pressure receiving wall 73) through the lateral holes 74 formed in the tubular wall 72.

The pressure receiving wall 73 includes a restriction hole (a choking hole) 75 that restricts the passing flow quantity of the evaporative fuel, which flows from the second valve chamber 34 toward the second flow passage 38. The restriction hole 75 extends through the pressure receiving wall 73 and communicates the back pressure chamber 71 to a downstream side portion of the second valve chamber 34 (a portion of the second valve chamber 34 located on a downstream side of the pressure receiving wall 73) and the second flow passage 38. A flow passage cross-sectional area of the restriction hole 75 is smaller than a flow passage cross-sectional area of the second valve hole 35. The back pressure chamber 71 is communicated with the downstream side portion of the second valve chamber 34 and the second flow passage 38 through the restriction hole 75 formed in the pressure receiving wall 73.

The second spring 4 is received between the cup valve 2 and the first housing 8 in a manner that enables expansion and contraction of the second spring 4. The second spring 4 is a compression coil spring, which generates the urging force (the spring force) against the cup valve 2 to urge the cup valve 2 away from the second valve seat 36 in the valve opening direction of the cup valve 2.

In the second valve chamber 34, the second spring 4 is placed between the spring seat of the cup valve 2 and the second spring seat 43 of the first housing 8 in a compressed state where the second spring 4 is compressed in the axial direction.

Next, details of the first and second housings 8, 9 will be described with reference to FIGS. 2 and 3.

The solenoid case 7 and the first housing 8 include the first annular step 15 and the second annular step 16, respectively, which are opposed to each other and are spaced from each other by a predetermined axial distance. The second housing 9 is held between the first annular step 15 and the second annular step 16 through the outer peripheral seal portion 65 of the diaphragm 14.

A second partition wall 42 is formed in the first housing 8 to partition a second hollow portion (a valve chamber, a flow passage), which is formed between the first housing 8 and the second housing 9, into the second valve chamber 34 and the second flow passage 38. A second valve hole 35, which is a second communication hole that communicates between the second valve chamber 34 and the second flow passage 38, extends through an inside of the second partition wall 42.

The first valve chamber 31, the first valve hole 32, the first valve seat 33, the second valve chamber 34, the second valve hole 35, and the second valve seat 36 are formed in the second housing 9.

The first partition wall 41 is formed in the second housing 9. The first partition wall 41 is configured into an annular form and partitions the first hollow portion (the valve chamber), which is formed in the inside of the second housing 9, into the first valve chamber 31 and the second valve chamber 34.

The first valve hole 32 extends through the inside of the first partition wall 41. The first valve hole 32 is a first communication hole that communicates between the first valve chamber 31 and the second valve chamber 34. The first partition wall 41 forms the second valve chamber 34 between the first partition wall 41 and the second spring seat 43 of the first housing 8, and the first partition wall 41 has a function of a limiting wall that limits a maximum amount of stroke of the cup valve 2.

The first housing 8 includes a connecting portion that connects between the first peripheral wall 11, which is configured into the tubular form and surrounds the second housing 9 in the circumferential direction, and the solenoid case 7.

In the connecting portion between the solenoid case 7 and the first housing 8, the connecting end surface of the connecting flange 17 and the connecting end surface the connecting flange 18 are abutted with each other, and the metal plate 19 is installed over both of the abutted connecting flanges 17, 18 and is plastically deformed to join between the flanges 17, 18.

An annular portion, which is fitted to the outer peripheral portion of the connecting flange 17 of the solenoid case 7, is formed in the connecting flange 18 of the first housing 8.

The second spring seat 43, which is configured into the annular form, is formed in the first housing 8, and the end of the second spring 4 is held or secured to the second spring seat 43. A plurality of lateral holes (inside-to-outside communication holes) 77 is formed in the second peripheral wall 12 of the second housing 9. In the second peripheral wall 12 of the second housing 9, each of the lateral holes 77 opens in a radial direction, which is perpendicular to the axial direction of the first valve chamber 31, to communicate between the inside (the first valve chamber 31) and the outside (the first flow passage 37) of the second peripheral wall 12.

A plurality of ridge guides (not show) is formed in an inner peripheral surface of the first housing 8 to support (guide) the cup valve 1 in a manner that enables reciprocating movement of the cup valve 1 in the axial direction of the first valve chamber 31. Also, a plurality of ridge guides 79 is formed in the inner peripheral surface of the first housing 8 to support (guide) the cup valve 2 in a manner that enables reciprocating movement of the cup valve 2 in the axial direction of the second valve chamber 34.

The second housing 9 includes the second peripheral wall 12, which is fitted into the first peripheral wall 11 of the first housing 8. The second peripheral wall 12 is configured into the tubular form and surrounds the first valve chamber 31 in the circumferential direction. A first ring groove 81, which is configured into an annular form, is formed in an outer peripheral surface of one axial end portion (a solenoid 6 side end portion) of the second peripheral wall 12 to circumferentially extend all around the second peripheral wall 12. Furthermore, a second ring groove 82, which is configured into an annular form, is formed in an outer peripheral surface of the other axial end portion (a second flow passage 38 side end portion) of the second peripheral wall 12 to circumferentially extend all around the second peripheral wall 12.

An O-ring 91, which is configured into an annular form, is installed between the inner peripheral surface of the first peripheral wall 11 of the first housing 8 and a groove bottom surface of the first ring groove 81 of the second peripheral wall 12 of the second housing 9. The O-ring 91 is a first seal material (first seal member), which limits leakage of the evaporative fuel from the first valve chamber 31 to the outside of the first peripheral wall 11 through a gap formed at the connecting portion (i.e., the connecting portion between the connecting flanges 17, 18).

An O-ring 92, which is configured into an annular form, is installed between the inner peripheral surface of the first peripheral wall 11 of the first housing 8 and a groove bottom surface of the second ring groove 82 of the second peripheral wall 12 of the second housing 9. The O-ring 92 is a second seal material (a second seal member), which limits leakage of the evaporative fuel from the first valve chamber 31 to the second valve chamber 34 or the second flow passage 38.

Next, an assembling method of a valve assembly of the tank closing solenoid valve 10, a valve assembly of the pressure responsive valve 20, and the first and second housings 8, 9 relative to the solenoid 6 and the solenoid case 7 will be briefly described.

First of all, the coil 46, the stator core 40 (including the stator core segments 47, 48), the yoke 51, and the ring core 52 are insert molded into the solenoid case 7. Furthermore, the stopper 45, the first spring 3, and the plunger 44 are inserted into the plunger receiving chamber 49.

Here, it is desirable that the valve assembly of the tank closing solenoid valve 10 and the plunger 44 are preassembled together before the installation of the plunger 44 into the solenoid case 7.

Specifically, the seal rubber 67 is first installed to the valve seal of the cup valve 1. Thereafter, the cylindrical tubular collar 13, the inner peripheral seal portion 66 of the diaphragm 14, and a connecting portion of the cup valve 1 are fitted to the outer peripheral surface of the shaft 5. In this state, the base end portion (the fitting shaft portion) of the shaft 5 is press fitted into the press fitting hole of the plunger breathing hole 53 of the plunger 44. In this way, the cylindrical tubular collar 13, the inner peripheral seal portion 66 of the diaphragm 14, and the connecting portion of the cup valve 1 are held and clamped between the end surface of the plunger 44 and the flange of the shaft 5.

Thereby, the valve assembly of the tank closing solenoid valve 10 and the plunger 44 are assembled together. Then, this assembly is installed into the solenoid case 7 along with the stopper 45 and the first spring 3. As a result, the assembling of the functional components of the solenoid 6 and the valve assembly of the tank closing solenoid valve 10 to the solenoid case 7 is completed (a first assembling step).

Next, the second spring 4 is inserted into the second valve chamber 34 of the first housing 8.

Thereafter, the O-rings 91, 92 are fitted into the first and second ring grooves 81, 82, respectively, of the second housing 9. At this time, a portion of each of the O-rings 91, 92 protrudes outward from the outer peripheral surface of the second peripheral wall 12 of the second housing 9 in the radial direction.

Next, the cup valve 2 is inserted into the second valve chamber 34 of the second housing 9.

Thereafter, the second housing 9, into which the cup valve 2 is assembled, is installed into the receiving chamber of the first housing 8 through the opening of the first peripheral wall 11 of the first housing 8 while the pressure receiving wall 73 of the cup valve 2 is placed at a forefront in an installation direction of the second housing 9 to the receiving chamber of the first housing 8. At this process, the second peripheral wall 12 of the second housing 9 is loose fitted into the radially inner side of the first peripheral wall 11 of the first housing 8 until that an outer peripheral projection 93, which is formed at the opening of the second peripheral wall 12 of the second housing 9, contacts the annular end surface of the opening of the first peripheral wall 11 of the first housing 8.

At this time, each of the O-rings 91, 92 seals a gap between the inner peripheral surface of the first peripheral wall 11 of the first housing 8 and the second peripheral wall 12 of the second housing 9.

In this way, the valve assembly of the tank closing solenoid valve 10, the valve assembly of the pressure responsive valve 20, and the second housing 9 are installed into the space, which is defined by the solenoid 6, the solenoid case 7, and the first housing 8. Thereby, the assembling of the valve assembly (the cup valve 1 and the pressure canceling mechanism) of the tank closing solenoid valve 10, the valve assembly (the cup valve 2 and the second spring 4) of the pressure responsive valve 20, and the first and second housings 8, 9 relative to the solenoid 6 and the solenoid case 7 is completed (a second assembling step).

Now, advantage of the first embodiment will be described.

As discussed above, in the tank closing solenoid valve 10 used in the fuel tank sealing system of the present embodiment, the second peripheral wall 12 of the second housing 9 is loosely fitted into the radially inner side of the first peripheral wall 11 of the first housing 8, so that the first valve chamber 31, which receives the valve assembly (the cup valve 1 and the pressure canceling mechanism) of the tank closing solenoid valve 10, and the second valve chamber 34, which receives the valve assembly (the cup valve 2, and the second spring 4) of the pressure responsive valve 20, are formed between the first flow passage 37 and the second flow passage 38 in the first housing 8.

Thereby, it is not required to heat-weld and bond the connecting end surface of the first housing 8 and the connecting end surface of the second housing 9 together. Thus, it is possible to limit occurrence of deformation of the valve seat surface of the first valve seat 33 (i.e., the valve seat surface of the first valve seat 33, against which the cup valve 1 of the tank closing solenoid valve 10 is seated), which would be otherwise induced by a heat generated at the time of heat-welding and bonding between the connecting portion of the first housing 8 and the connecting portion of the second housing 9. Deformation of the valve seat surface of the first valve seat 33 can be limited since the second peripheral wall 12 of the second housing 9 is not press fitted into the radially inner side of the first peripheral wall 11 of the first housing 8. Thus, it is possible to limit deterioration of gas sealing performance of the cup valve 1 relative to the first valve seat 33 at the valve closing time of the tank closing solenoid valve 10, i.e., at the time of sealing the fuel tank FT.

Furthermore, since it is not required to heat-weld and bond the first and second housings 8, 9 together, it is possible to limit occurrence of deformation of the seat surface of the second spring seat 43 (the seat surface of the second spring seat 43 is provided to hold or secure the second spring 4 of the pressure responsive valve 20), which would be otherwise induced by the heat generated at the time of heat-welding and bonding between connecting portions of the first and second housings 8, 9. Thereby, the spring force of the second spring 4 does not change from a preset value. Thus, it is possible to stabilize the stroke change characteristics of the cup valve 2 of the pressure responsive valve 20 relative to the pressure change of the evaporative fuel. Also, it is possible to stabilize flow quantity characteristics of the evaporative fuel relative to the stroke change of the cup valve 2.

Furthermore, since the O-ring 91 is interposed between the first peripheral wall 11 of the first housing 8 and the second peripheral wall 12 of the second housing 9, it is possible to limit the leakage of the evaporative fuel from the first valve chamber 31 to the outside of the solenoid case 7 and the first housing 8 through the gap formed at the connecting portion between the solenoid case 7 and the first housing 8. That is, it is possible to limit the leakage of the evaporative fuel to the outside of the tank sealing solenoid valve SV.

Furthermore, since the O-ring 92 is interposed between the first peripheral wall 11 of the first housing 8 and the second peripheral wall 12 of the second housing 9, it is possible to limit the leakage of the evaporative fuel from the first valve chamber 31 to the second valve chamber 34 or the second flow passage 38 located on the downstream side of the second valve chamber 34. That is, it is possible to limit the leakage of the evaporative fuel from the first valve chamber 31 to the second valve chamber 34 when the cup valve 2 is seated against the second valve seat 36 (when the pressure responsive valve 20 is closed).

Now, modifications of the above embodiment will be described.

In the above embodiment, the solenoid valve of the present disclosure is applied to the tank sealing solenoid valve SV installed in the fuel tank sealing system. However, the present disclosure is not limited to this. For example, the solenoid valve of the present disclosure may be applied to any other appropriate solenoid valve (an electromagnetic control valve), such as a purge control valve PV or the canister control valve CV installed in the evaporative fuel processing system. The fluid of the present disclosure is not limited to the gas, such as the air or the evaporative fuel. For example, the fluid of the present disclosure may be gas (e.g., gas phase refrigerant), liquid (e.g., water, fuel, oil, liquid phase refrigerant), or fluid in a gas-liquid two-phase state. Furthermore, the amount of stroke of the first valve element may be increased or decreased in response to an increase in a voltage value or a current value of the electricity supplied to the coil of the solenoid.

In the above embodiment, the electromagnetic control valve installed in the solenoid valve of the present disclosure is applied to the tank closing solenoid valve of the normally closed type, in which the cup valve 1 synchronously driven in response to the movement of the plunger 44 is opened when the plunger 44 is magnetically attracted to the core side by the magnetic force of the coil 46 of the solenoid 6. Alternatively, the electromagnetic control valve of the present disclosure may be applied to an electromagnetic control valve of a normally open type, in which the first valve element synchronously driven in response to the movement of the plunger is closed when the plunger is magnetically attracted to the core side by the magnetic force of the coil of the solenoid.

In the above embodiment, the second spring seat 43 and the ridge guides 79 are provided in the first housing 8. Alternatively, the second spring seat 43 or the ridge guides 79 may be provided into the second housing 9.

In the above embodiment, the second valve chamber 34, which movably receives the cup valve (the second valve element) 2 and the second spring 4, is provided over the first and second housings 8, 9. Alternatively, the second valve chamber 34, which movably receives at least the cup valve (the second element) 2, may be provided only in the second housing 9.

What is claimed is:

1. A solenoid valve comprising:
    an opening and closing valve that is a solenoid-operated valve and includes a first valve element, wherein a first valve seat is disposed in a first valve chamber, into which fluid is supplied, and the first valve element is seatable against and is liftable away from the first valve seat to close and open a valve hole communicated with the first valve chamber;

a flow quantity adjusting valve that is a pressure-operated valve and includes:
a second valve element that adjusts a flow quantity of the fluid, which flows through a second valve chamber that receives the fluid from the first valve chamber through the valve hole, in response to an amount of stroke of the second valve element relative to a second valve seat disposed in the second valve chamber during a valve opening time of the opening and closing valve; and
a spring that urges the second valve element toward a valve opening side in an axial direction of the second valve chamber; and
a housing that reciprocatably receives the first valve element in the first valve chamber and reciprocatably receives the second valve element in the second valve chamber, wherein:
the housing includes:
a first housing that is placed on a radially outer side of the first valve chamber and the second valve chamber in a radial direction, which is perpendicular to the axial direction; and
a second housing that is loosely fitted into a radially inner side of the first housing and forms the first valve chamber, the second valve chamber and the valve hole in an inside of the second housing; and
one of the first housing and the second housing includes a spring seat, at which an end of the spring is held or secured.

2. The solenoid valve according to claim 1, comprising a solenoid that includes a coil, which generates a magnetic force to magnetically attract a plunger toward a valve opening side of the first valve element when the coil is energized, wherein the first valve element is connected to the plunger in a manner that enables integral movement of the first valve element and the plunger.

3. The solenoid valve according to claim 2, wherein:
the solenoid and the first housing include a first annular step and a second annular step, respectively, which are opposed to each other in the axial direction while the first annular step and the second annular step are spaced from each other by a predetermined axial distance; and
the second housing is clamped and is held between the first annular step and the second annular step.

4. The solenoid valve according to claim 2, comprising a solenoid case that receives the solenoid.

5. The solenoid valve according to claim 4, wherein:
the first housing includes:
a first peripheral wall, which is configured into a tubular form and surrounds the second housing in a circumferential direction; and
a connecting portion, at which the first housing is connected to the solenoid case;
the second housing includes a second peripheral wall that is configured into a tubular form and is fitted into the first peripheral wall to surround the first valve chamber in the circumferential direction; and
the second peripheral wall has a first seal material, which is configured into an annular form and is held between an inner peripheral surface of the first peripheral wall and the second peripheral wall to limit leakage of the fluid from the first valve chamber to an outside of the first peripheral wall through a gap formed at the connecting portion.

6. The solenoid valve according to claim 4, wherein:
the second housing forms the first valve chamber between the second housing and the solenoid case and also forms the second valve chamber between the second housing and the first housing;
the second housing includes a limiting wall that is configured into an annular form and limits a maximum amount of stroke of the second valve element; and
the valve hole extends through the limiting wall and communicates between the first valve chamber and the second valve chamber.

7. The solenoid valve according to claim 1, wherein:
the first housing includes:
a first peripheral wall, which is configured into a tubular form and surrounds the second housing in a circumferential direction;
a first flow passage, which is placed on an upstream side of the first valve chamber in a flow direction of the fluid; and
a second flow passage, which is placed on a downstream side of the second valve chamber in the flow direction of the fluid;
the second housing includes a second peripheral wall that is configured into a tubular form and is fitted into the first peripheral wall to surround the second valve chamber in the circumferential direction; and
the second peripheral wall has a second seal material, which is configured into an annular form and is held between the second peripheral wall and an inner peripheral surface of the first peripheral wall to limit leakage of the fluid from the first valve chamber to the second valve chamber or the second flow passage.

8. The solenoid valve according to claim 1, wherein during the valve opening time of the first valve element, the amount of stroke of the second valve element is changed according to balance between a pressure of the fluid, which is guided from the first valve chamber into the second valve chamber through the valve hole, and a spring force of the spring, and the second valve element adjusts the flow quantity of the fluid, which passes through the second valve chamber, according to a change in the amount of stroke of the second valve element.

9. The solenoid valve according to claim 1, wherein the second valve element includes:
a tubular wall that opens at one side where the second valve chamber is placed, wherein a pressure chamber is formed in an inside of the tubular wall; and
a pressure receiving wall that closes an opposite side of the tubular wall, which is opposite from the one side of the tubular wall where the second valve chamber is placed, wherein the pressure receiving wall receives a pressure of the fluid guided into the second valve chamber.

10. The solenoid valve according to claim 9, wherein:
the first housing includes:
a first flow passage, which is placed on an upstream side of the first valve chamber in a flow direction of the fluid; and
a second flow passage, which is placed on a downstream side of the second valve chamber in the flow direction of the fluid;
the tubular wall of the second valve element includes a plurality of lateral holes, each of which opens in a direction perpendicular to the axial direction; and
the pressure receiving wall includes a restriction hole that restricts the flow quantity of the fluid, which flows from the second valve chamber toward the second flow passage.

11. The solenoid valve according to claim 1, wherein the first housing includes a guide that supports the second valve element in a manner that enables reciprocation of the second valve element in the axial direction of the second valve chamber.

12. The solenoid valve according to claim 1, wherein:
the first housing includes:
   a first flow passage, which is placed on an upstream side of the first valve chamber in a flow direction of the fluid; and
   a second flow passage, which is placed on a downstream side of the second valve chamber in the flow direction of the fluid; and
the second housing is inserted and is placed between the first flow passage and the second flow passage in the first housing.

* * * * *